Oct. 20, 1959  H. L. FISH  2,909,055
TORQUE METER
Filed Nov. 29, 1955
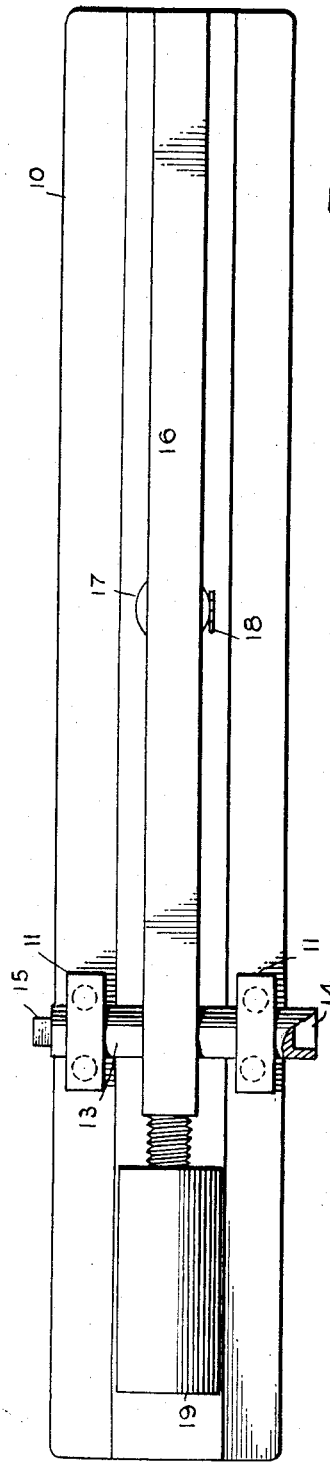
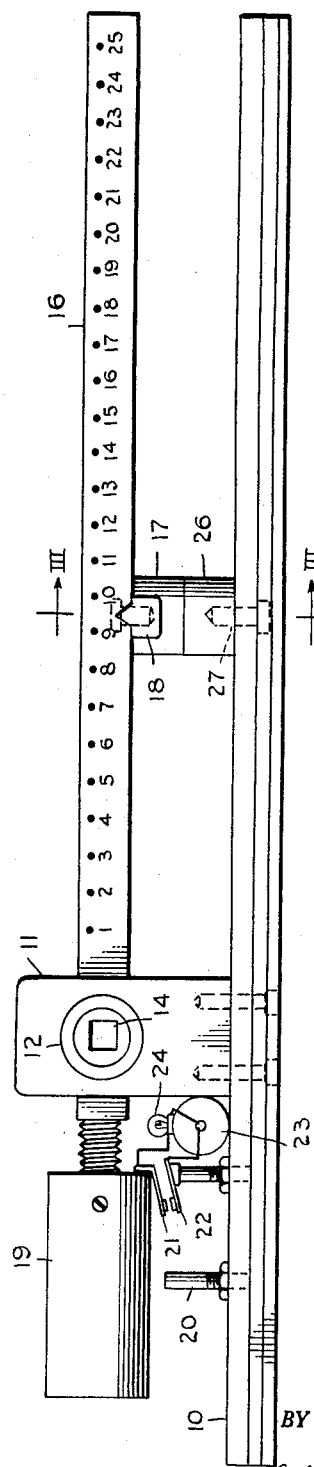
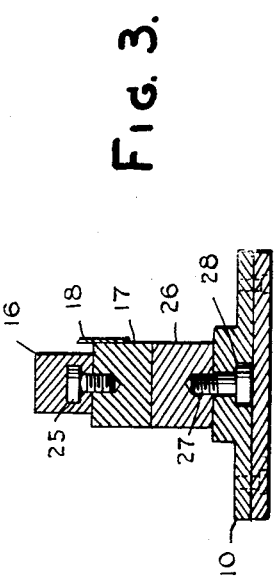
INVENTOR.
HERBERT L. FISH
BY
*Holcombe, Wetherill & Brisebois*
ATTORNEYS.

United States Patent Office 2,909,055
Patented Oct. 20, 1959

2,909,055

TORQUE METER

Herbert L. Fish, Inglewood, Calif.

Application November 29, 1955, Serial No. 549,690

4 Claims. (Cl. 73—1)

The present invention relates to a torque meter, and more in particular to torque testing devices employing this meter, and to torque wrenches employing this meter.

Torque wrenches have found extensive use in the industry of today, particularly in the air-craft and automotive industries. During assembly and maintenance it is necessary that a proper pre-load be applied to a threaded connection or junction. This is usually accomplished by means of a torque wrench, which vary in torque load from a few inch ounces to many foot pounds.

In order to calibrate torque wrenches it is necessary to have a standardized tester that will give a standard measured rating so that all wrenches may be adjusted to give similar torque.

The air-craft industry uses special torque wrenches for assembling air-craft. However, the line mechanic does not have comparative torque wrenches for maintaining the same air-craft. It is therefore imperative, in order to have the proper maintenance, that a torque wrench tester or reliable accuracy be available. Many air-craft accidents have been traced to improper assembly, due to failure caused by improper torsion. Modern air-craft and electronic industries require a wrench having a torque of very few inch ounces.

It is an object of this invention to supply a torque meter that may be used as a wrench or a tester, having simple construction, that may be used in any position and that will supply an accurate torque measurement in the neighborhood of one to five inch ounces.

It is also an object of this invention to produce a torque wrench tester that has the minimum number of moving parts, thereby avoiding the frictional complications found in the devices now in common use.

It is a further object of this invention to provide a torque wrench tester and a torque wrench having a magnetic activated action and thereby avoiding spring loaded action and the fatigue occurring in such spring loaded devices.

It is also an object of this invention to produce a torque meter, comparatively light in weight and devoid of excessive linkages having attached to these linkages heavy counterweights, the displacement of which is used to measure the applied torque.

A further object of this invention is to avoid the use of torque bars and to provide a torque meter having a quick or snap action that does not depend upon visual observation during operation.

These and other objects will be apparent to one skilled in the art from the detailed description taken in conjunction with the drawings which illustrate a preferred embodiment of this invention as applied to a torque tester wherein:

Figure 1 is a plan view of a torque tester.
Figure 2 is a side view thereof.
Figure 3 is a sectional view on line III—III of Fig. 2.

Referring more in particular to the drawings, the base 10 has rigidly mounted thereon the journal housings 11, 11, containing the bearings 12, shown in Figure 2. These bearings are preferably of the ball bearing or roller bearing type and support the shaft 13 therein. This shaft has a female fitting 14, in the right hand end thereof and the male fitting 15 on the left hand side thereof, and for purposes of illustration this torque meter will be used to test wrenches for right hand torque, but may be reversed, or adapters may be used to test for left hand torque. Rigidly mounted on the shaft 13 is the graduated bar 16. One end of this bar has appropriate graduations thereon. Mounted in slidable relation thereto is a magnet 17. On this magnet is an indicator 18 so as to facilitate the adjustment thereof on the bar. The other end of this bar has a counterweight 19 adjustably mounted thereon. Below the counterweight is a stop 20. Attached to the counterweight is one contact of an electric switch 21. The other contact for the electric switch 22 is rigidly mounted on the base 10 and is so adjusted that when the counterweight is lowered the contacts are closed. Attached to this switch with appropriate electrical leads is a battery 23 and a lamp 24 so arranged that when the switch is closed the lamp will light giving a visual indication of the lowering of the counterweight.

The magnet 17 is slidably mounted on the bar 16 and is held thereto by means of bolt 25 sliding in a groove cut into the bar, as shown in Fig. 3, and is attracted by the metal directly therebelow and held in place by magnetic attraction. Different magnets of different magnetic strength may be used by simply removing the magnet 17 and substituting therefor a magnet of greater or less strength to increase the load on the bar 16.

Whereas above, reference has been made to only one magnet that may be attached to the bar 16, an opposing magnet 26 of dissimilar polarity may be slidably mounted on the base 10, as shown in Figures 2 and 3. This companion magnet will greatly increase the magnetic attraction, and may be used when higher loads are desired. The magnet 26 may be similarly mounted to the magnet 17, being held in place by means of a screw 27, sliding in a channel 28 in the base 10.

When it is desired to use this torque meter as a tester, a torque wrench may be applied to the shaft 13 and torque applied thereto, tending to lower the counterweight 19. When the force of the magnet 17 has been overcome the bar 16 will rise and the counterweight 19 will drop rapidly as the magnetic attraction decreases, as the distance between the magnets 17 and 26 increases, producing thereby a snap or quick opening action.

This torque meter has been described above having the source of torque applied directly to the shaft 13. This of course may be varied and a cam could be used to raise the bar 16 and thereby measure the torque at the point at which the bar releases.

This torque meter may be used as a torque wrench when the nut to be tightened is attached to the male fitting 15 and force applied on the base 10 until the bar 16 rises against the magnetic attraction due to the magnets 17 and 26, thereby indicating that the desired torque has been applied to the nut or fitting being tightened.

It is readily seen that this device does not depend on any spring load action; that it is free from fatigue normally found in spring loaded devices. Also it does not depend on the displacement of the weight against the force of gravity and it is not subject to the disadvantages found in this type of device commonly now in use. There is no bar that is deformed due to the torsion applied thereto as is found in some torsion wrenches.

The simple device illustrated in this invention may be used in any position; side-wise, upside down or resting on the base 10, as the force applied to the bar is magnetic force and does not depend on the force of gravity. All weight loads are counter-balanced about the shaft 13 and the magnetic force alone is measured by the application of torque to the shaft 13.

Whereas, a torque tester employing the torque meter of this invention has been described, it may also be employed in a torque wrench as described above, and both of these devices come within the use of the torque meter, which is the subject of this invention.

Two applications of the torque meter have been described herein but these and many other uses of this meter will be apparent to one skilled in the art as well as many variations of the use of magnetic forces in such meters.

What is claimed is:

1. A testing apparatus for a torque wrench, having a torque head and a torque meter, comprising: a base having mounted thereon upright bearing journals, a shaft in said journals having adapters on the opposite ends thereof to receive said wrench, a bar rigidly mounted on said shaft, magnetic means on said base positioned directly below one end of said bar, said end of said bar being graduated and having a magnet slidably attached thereto to increase the load thereon and contacting said magnetic means to hold the bar in closed position, the other end of said bar having an adjustable counterweight thereon.

2. A testing apparatus as claimed in claim 1 having electrical means attached to the bar to indicate movement of the bar away from the closed position.

3. A testing apparatus for a torque wrench as claimed in claim 1, having in addition thereto a second magnet slidably mounted in said base to cooperate with said first mentioned magnet to normally hold it in a closed position.

4. A torque wrench comprising an elongated base member having journal means mounted thereon, a shaft pivotally mounted in said journal means, and a bar rigidly mounted on said shaft, said bar being graduated, a magnet slidably attached to said bar, magnetic means on said base member positioned to contact said magnet, the ends of said shaft being provided with work engaging means.

References Cited in the file of this patent

UNITED STATES PATENTS

| | | |
|---|---|---|
| 1,296,932 | Dodge | Mar. 11, 1919 |
| 1,881,060 | Okey | Oct. 4, 1932 |
| 2,279,076 | Sutton | Apr. 7, 1942 |
| 2,342,919 | Chapman | Feb. 29, 1944 |
| 2,486,632 | Burke | Nov. 1, 1949 |
| 2,747,403 | Stevenson | May 29, 1956 |